United States Patent [19]

Medlock

[11] 4,297,774
[45] Nov. 3, 1981

[54] METHOD FOR MODIFYING A FLUID FUEL METERING JET ORIFICE

[76] Inventor: Alfred A. Medlock, P.O. Box 627, Ocean Springs, Miss. 39564

[21] Appl. No.: 79,309

[22] Filed: Sep. 26, 1979

[51] Int. Cl.³ .......................... B23P 15/16; B23P 6/00
[52] U.S. Cl. ................................... 29/157 C; 29/557; 29/402.19; 72/68; 72/340
[58] Field of Search ................... 29/157 C, 558, 557, 29/402.19, 402.05; 72/68, 354, 340; 10/152 R, 152 S, 86 R

[56] References Cited

U.S. PATENT DOCUMENTS

| 680,991 | 8/1901 | Crosby | 10/86 R |
|---|---|---|---|
| 2,205,871 | 6/1940 | Young | 10/152 R |
| 3,010,126 | 11/1961 | Willcox | 10/152 R |
| 3,150,442 | 9/1964 | Straw et al. | 29/157 C |
| 3,167,860 | 2/1965 | Welles, Jr. et al. | 29/402.19 |
| 3,899,912 | 8/1975 | Orain | 29/149.5 DP |

FOREIGN PATENT DOCUMENTS

| 697557 | 9/1940 | Fed. Rep. of Germany | 10/152 |
|---|---|---|---|
| 22402 | 12/1961 | Fed. Rep. of Germany | 10/152 R |

*Primary Examiner*—Daniel C. Crane
*Attorney, Agent, or Firm*—Harvey B. Jacobson

[57] ABSTRACT

Structure is provided for inwardly collapsing those portions of a needle jet defining at least the outlet end portion of the jet orifice extending therethrough and for providing the resultant smaller jet orifice with spiral grooves in its walls.

2 Claims, 6 Drawing Figures

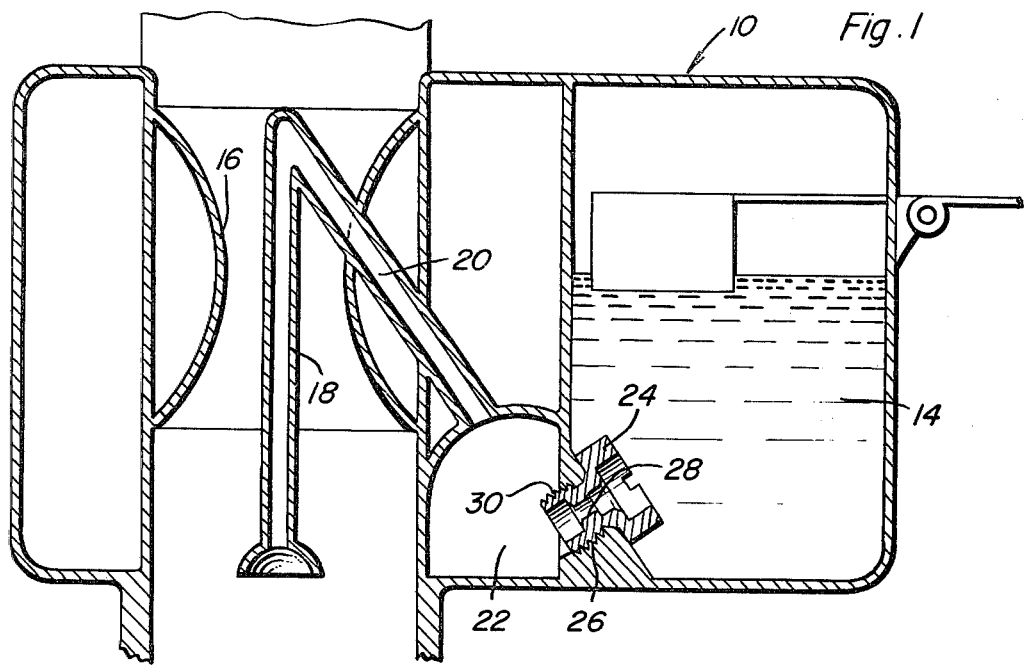
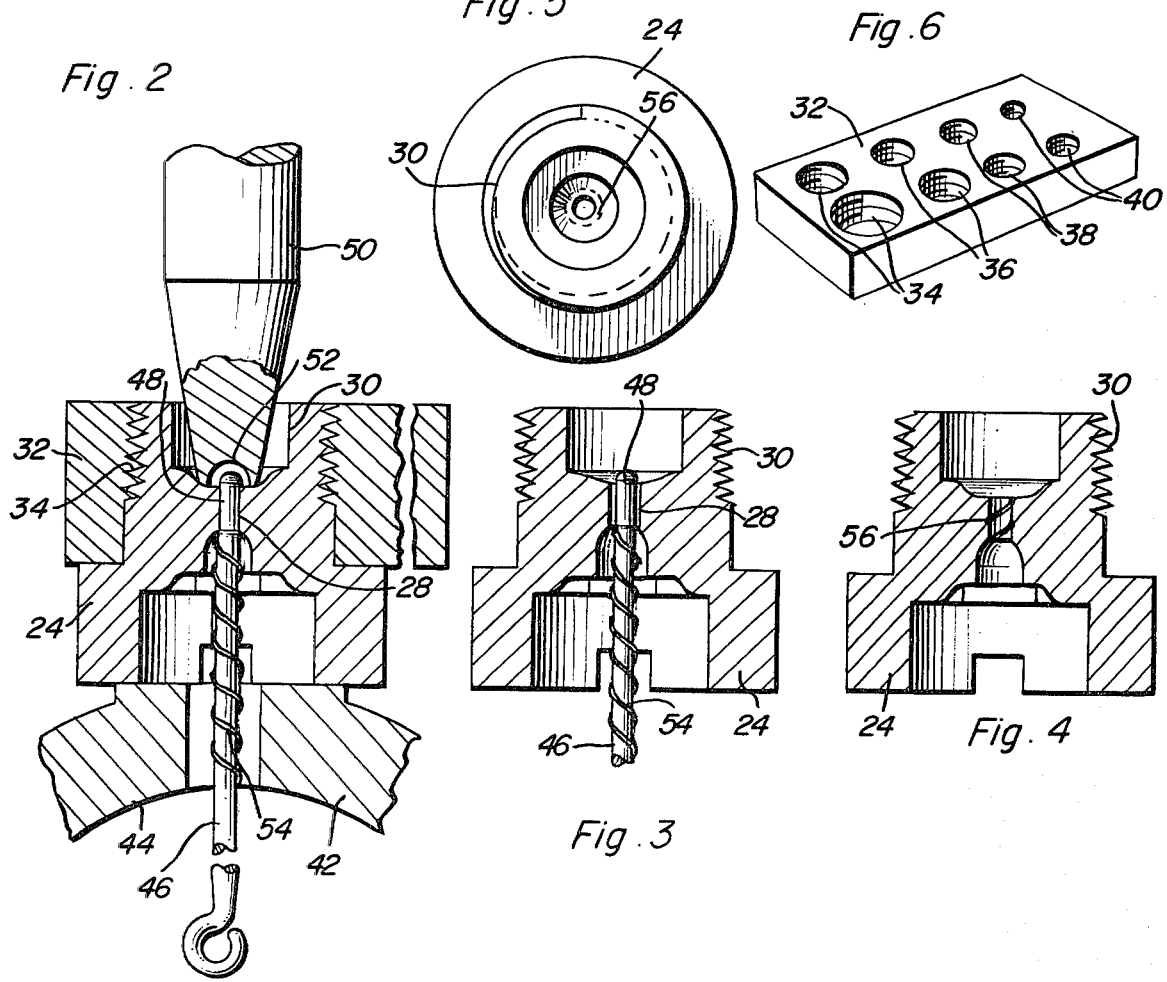

METHOD FOR MODIFYING A FLUID FUEL METERING JET ORIFICE

BACKGROUND OF THE INVENTION

The automotive industry has in recent years become increasingly conscious of the fact that the automobile buying public is very much interested in fuel economy. The recent increase in fuel economy is a substantial reversal of the prevailing trend in the late 1960's which found the automotive buying public interested more in performance than in fuel economy. As a result of the past interest in performance as opposed to economy, many automobiles manufactured prior to 1969 and those manufactured between 1969 and 1975 (the years 1969–1975 representing the first six years of substantial attempts at exhaust emission controls which resulted in less exhausting emissions but poor fuel economy) deliver poor fuel economy but are still being driven. As a result, attempts have been made to render prior 1976 automobiles more fuel efficient.

Some of these past attempts have proven to be at least partially effective, but most have failed to produce more than minimal increases in fuel economy. Accordingly, a need exists for a means (method and apparatus) whereby prior 1976 vehicles may be rendered more fuel efficient.

BRIEF DESCRIPTION OF THE INVENTION

The method and apparatus of the instant invention include structure and steps whereby the orifices in fluid fuel metering jets may be effectively collapsed and provided with spiral grooves in their walls. By collapsing the jet orifices in a controlled manner to a smaller diameter and by providing the wall surfaces thereof with spiral grooves, considerably greater fuel economy may be obtained, at least in most instances.

The main object of this invention is to provide a method and apparatus for rendering pre-1976 vehicle engines more fuel efficient.

Another object of this invention is to provide an apparatus whereby the jet orifices of fuel metering jets utilized in pre-1979 vehicle carburetors may be reduced in diameter and provided with spiral grooves in their walls.

Yet another object of this invention is to provide an apparatus constructed in a manner whereby it will accept substantially all carburetor fuel metering jets of the removable type utilized in carburetors produced prior to 1979.

A final object of this invention to be specifically enumerated herein is to provide an apparatus in accordance with the preceding objects and which will conform to conventional forms of manufacture, be of simple construction and easy to use so as to provide a device which will be economically feasible, long lasting and relatively trouble free in operation.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a schematic sectional view of a conventional form of single barrel carburetor illustrating the positioning of the metering jet of the carburetor;

FIG. 2 is a fragmentary sectional view illustrating the manner in which the jet orifice through the metering jet may be collapsed to be of a considerably smaller diameter, at least at the discharge end thereof;

FIG. 3 is a further sectional view illustrating the manner in which the collapsed jet orifice may be provided with spiral grooves in its walls;

FIG. 4 is a sectional view similar to FIG. 3 but illustrating the metering jet after having been completely modified in accordance with the present invention;

FIG. 5 is a top plan view of the modified jet illustrated in FIG. 4; and

FIG. 6 is a perspective view of the support block portion of the apparatus of the instant invention.

DETAILED DESCRIPTION OF THE INVENTION

Referring now more specifically to the drawings, the numeral 10 generally designates a conventional form of carburetor including a float bowl 14 and a venturi 16. A fuel discharge tube 18 is disposed within the venturi 16 and an inclined passage 20 has its upper end communicated with the upper end of the fuel discharge tube 18 and its lower end communicated with a chamber 22 within the carburetor 10 adjacent the float bowl 14. A fuel metering jet 24 is threaded in a passage 26 communicating the float bowl 14 with the chamber 22 and thus the metering jet 24 meters the flow of fuel from the float bowl 14 into the chamber 22 and ultimately into the fuel discharge tube 18.

The foregoing is to be considered as conventional carburetor construction.

The metering jet 24 has a jet orifice 28 formed therethrough and a diametrically reduced externally threaded neck 30 which is threaded into the passage 26.

The structure of the instant invention includes a support block 32 having a plurality of pairs of different size threaded bores 34, 36, 38 and 40 formed therein. The threaded bores 34, 36, and 40 are of different sizes to receive the various different sizes of threaded necks 30.

In order to modify the jet orifice 28 formed through the metering jet 24, the neck 30 is threaded into the appropriated bore formed in the block 32 and the latter is then inverted and positioned with the inlet end of the metering jet 24 resting on top of and spanning the space between a pair of closely spaced apart vise jaws 42 and 44. Thereafter, one of a plurality of rods 46 having different size diametrically reduced cylindrical end portions 48 is positioned with the cylindrical end portion thereof loosely received through the jet orifice 28. Thereafter, a center punch 50 having a centrally relieved tip as at 52 is placed over the outlet end of the jet orifice 28 and the terminal end of the diametrically reduced end portion 48 and struck lightly but sharply with an impact tool. This causes the material of the metering jet 24 (usually brass) to be collapsed tightly about the diametrically reduced cylindrical end portion 48 in order to reduce the diameter of the jet orifice 28. Then, the rod 46, which includes a spiral flute 54 on its larger diameter end portion, is "threaded" through the reduced jet orifice 28 in order to form a spiral groove 56 in the walls of the jet 24 defining the collapsed jet orifice.

It is proposed that a kit will be marketed including the block 32, a plurality of different size rods 46 and one or more punches such as the center punch 50 although these may be individually purchased on the open market.

When the metering in jet 24 is initially removed from the carburetor 10 and installed in the block 32, different rods are selected for insertion of the diametrically reduced ends 48 thereof into the metering jet orifice 28. When a rod end portion is found that is snugly received within the orifice 28, a rod of one or two sizes smaller is selected and its diametrically reduced cylindrical end portion 48 is positioned through the orifice 28 in the manner illustrated in FIG. 2 of the drawings. Then, when the center punch 50 is sharply but lightly tapped, the original size jet orifice 28 is collapsed down to a diameter two sizes less than the original size. After the jet orifice has been collapsed down to two sizes smaller, the spiral fluted portion 54 of the same rod 46 is then threaded through the collapsed orifice in order to define the spiral groove 56. The metering jet 24 may then be reinstalled in the carburetor and the associated engine tested.

If during testing, it becomes apparent that the smaller jet orifice is two small, the jet 24 may again be removed from the carburetor and the next larger size rod fluted portion 54 may be threaded through the reduced size jet orifice. Thereafter, the thrice modified metering jet 24 may be reinstalled in the carburetor 10.

When modifying carburetor jets utilized in high performance engines manufactured during the early and mid 1960's, the cylindrical rod end portion 48 about which the jet material is to be collapsed in the manner illustrated in FIG. 2 of the drawings may be four or five sizes smaller than the rod cylindrical end portion which may be snugly received in the unmodified jet orifice. Inasmuch as these earlier high performance engines utilized richer air-fuel mixture ratios, a greater reduction of the fuel metering jet orifice size may be utilized while still maintaining smooth engine operation. Of course, these earlier high performance engines will experience considerably greater fuel savings than later year non-high preformance engines.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A method of modifying a liquid fuel carburetor metering jet orifice for fuel economy purposes and wherein the jet is constructed of a soft malleable metal such as brass and the orifice therethrough is longitudinally straight and includes inlet and outlet end portions, said method comprising:
    (a) ascertaining at least the approximate diameter of said orifice;
    (b) providing a single rod having a nonthreaded gauge pin portion and a low pitch screw threaded portion;
    (c) placing said cylindrical gauge pin portion of a preselected size smaller in diameter than said orifice through the latter;
    (d) applying a controlled sharp impact force to said jet throughout a circular zone generally concentric with said orifice on the surface of said jet through which the outlet end portion of said orifice opens and in a direction substantially paralleling the center line of said orifice, whereby to collapse those portions of said jet defining said outlet end portion of said orifice tightly about the adjacent portions of said gauge pin portion; and
    (d) threading a low pitch screw threaded pin portion through said collapsed orifice end portion from the inlet end of said orifice, wherein the minor and major diameters of the threads on the last mentioned pin portion are less and greater than, respectively, the diameter of the collapsed orifice end portion.

2. The method claim 1 wherein (d) is effected by placing the side of said jet opposite the side thereof through which said outlet end portion of said orifice opens against a stationary abutment surface, placing a center relieved punch end against the first mentioned side of said jet and controllably impacting said punch with an impact tool.

* * * * *